(12) United States Patent
Garcia et al.

(10) Patent No.: US 7,465,088 B2
(45) Date of Patent: Dec. 16, 2008

(54) THERMAL SENSING SYSTEM

(75) Inventors: Gino S. Garcia, Edmonds, WA (US); Anthony E. Hillyerd, Sammamish, WA (US); James C. Marshall, Puyallap, WA (US); Michael Schwager, Bellevue, WA (US)

(73) Assignee: Microsoft Corporation, Remond, WA (US)

( * ) Notice: Subject to any disclaimer, the term of this patent is extended or adjusted under 35 U.S.C. 154(b) by 96 days.

(21) Appl. No.: 11/425,926

(22) Filed: Jun. 22, 2006

(65) Prior Publication Data

US 2007/0296541 A1 Dec. 27, 2007

(51) Int. Cl.
*G01N 25/00* (2006.01)
*G01K 1/14* (2006.01)
*H01M 2/18* (2006.01)

(52) U.S. Cl. .......................... 374/153; 374/208; 374/4; 320/150; 429/121

(58) Field of Classification Search .................. 429/121; 430/DIG. 9
See application file for complete search history.

(56) References Cited

U.S. PATENT DOCUMENTS

| | | | | |
|---|---|---|---|---|
| 4,616,171 A * | 10/1986 | Hernandez et al. | ........... | 320/142 |
| 5,070,427 A * | 12/1991 | Bush | ........................ | 361/104 |
| 5,095,259 A * | 3/1992 | Bailey et al. | ................. | 320/114 |
| 5,144,217 A * | 9/1992 | Gardner et al. | ............... | 320/110 |
| 5,686,815 A * | 11/1997 | Reipur et al. | ................ | 320/116 |
| 5,796,588 A * | 8/1998 | Machida et al. | ............. | 361/773 |
| 5,926,659 A * | 7/1999 | Matsui | ........................ | 396/206 |
| 6,984,065 B2 * | 1/2006 | Roepke | ....................... | 374/100 |
| 7,002,785 B1 * | 2/2006 | Bothe et al. | .................. | 361/103 |
| 7,112,388 B2 * | 9/2006 | Kishida | ....................... | 429/121 |
| 7,163,336 B2 * | 1/2007 | Blakeley, III | ............... | 374/142 |
| 7,187,156 B2 * | 3/2007 | Nakasho et al. | ............. | 320/107 |
| 7,208,916 B1 * | 4/2007 | Boatwright et al. | ......... | 320/150 |
| 2002/0070709 A1 * | 6/2002 | Small et al. | .................. | 320/150 |
| 2003/0082440 A1 * | 5/2003 | Mrotek et al. | ............... | 429/123 |
| 2005/0184732 A1 * | 8/2005 | Restaino et al. | ............. | 324/426 |
| 2007/0154800 A1 * | 7/2007 | Takeshita et al. | ............ | 429/179 |

* cited by examiner

*Primary Examiner*—Gail Verbitsky
(74) *Attorney, Agent, or Firm*—Shook, Hardy & Bacon L. L. P.

(57) ABSTRACT

A thermal sensing system includes a one-piece clip formed of a thermally conductive material. The clip includes a flat, substantially enclosed portion with tabs extending upward from it for connecting the clip to a printed circuit board. The clip also includes a contact portion that is configured to contact a thermally emitting object along a substantial portion of its surface. The thermal sensing system also includes a thermistor. The thermistor may be mounted to the printed circuit board or directly mounted to the clip. Heat is transferred from the thermal object to the thermistor via the clip. This system may be used in various arrangements in which temperature of an object is monitored or maintained within a given range. For example, the system may be used with a rechargeable mouse to monitor the temperature of the replaceable battery during charging and discontinue charging should the temperature reach a predetermined limit.

20 Claims, 9 Drawing Sheets

THERMAL SENSING SYSTEM

BACKGROUND

Rechargeable batteries have been used for many years in a variety of applications. In the past, nickel cadmium rechargeable batteries were used; however such batteries often have toxic effects and suffer from memory effects. For instance, if a nickel cadmium rechargeable battery is not fully drained before being recharged, the battery may lose its ability to be fully recharged. To avoid the negative features of nickel cadmium batteries, nickel metal hydride batteries are used for their additional storage capacity. In addition, nickel metal hydride batteries do not suffer from memory effects.

Rechargeable nickel metal hydride batteries carry a risk of overheating during recharging. This overheating may cause damage to the battery, the system in which the battery is used or the user. In order to avoid overheating, the temperature of the battery is monitored to ensure the battery does not overheat. A thermistor, or other temperature sensing device, is used to sense the temperature and often includes a shut off control when the temperature of the battery reaches a predetermined high point. The thermistor often requires the use of thermal epoxy or other thermal adhesives to conduct heat.

In existing thermal sensing systems (such as those discussed above), there may be limited contact between the thermistor or thermal contacts and the battery. For example, temperature is often sensed at the battery terminals. This can result in inaccurate temperature sensing.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In at least some embodiments, a thermal sensing system is configured to sense the temperature of a thermally emitting object by transferring heat from the thermally emitting object to a thermistor via a thermal clip. The thermal sensing system includes a thermally emitting object, such as a battery. In addition, the thermal sensing system includes a one-piece clip formed of a thermally conductive material. The one-piece clip includes a flat, substantially enclosed portion from which a plurality of tabs extend. The tabs are configured to provide a connection between the one-piece clip and a printed circuit board. The one-piece clip also includes a vertical stem, extending downward from the flat, substantially enclosed portion. The vertical stem includes a pocket formed on a side of the stem and a contact portion. The contact portion of the clip is configured to contact the thermally emitting object. For example, the contact portion may be a shape similar or identical to that of the thermally emitting object such that the contact portion is in contact with the thermally emitting object over a substantial portion of the surface of the thermally emitting object. This substantial contact may aid in transfer of heat and thus aid in more accurate temperature control.

A thermal sensing system may also include a thermistor. The thermistor may be mounted to a printed circuit board or directly to the thermal clip. The thermistor is in thermal contact with the thermally emitting object through a thermally conductive path including the thermal clip in order to sense the temperature of the thermally emitting object.

In one illustrative example, the thermal sensing system may be used in a rechargeable device, such as a wireless mouse or keyboard with one or more replaceable batteries. The thermal sensing system may be used to monitor the temperature of the rechargeable battery during charging. The thermal sensing system may be configured to discontinue charging if the temperature of the battery reaches a predetermined limit, such as a temperature that may indicate overheating.

Additional features and advantages of various embodiments are further described below.

BRIEF DESCRIPTION OF THE DRAWINGS

Aspects of the invention are illustrated by way of example and not by limitation in the accompanying figures in which like reference numerals indicate similar elements and in which.

DETAILED DESCRIPTION

Figure 1:
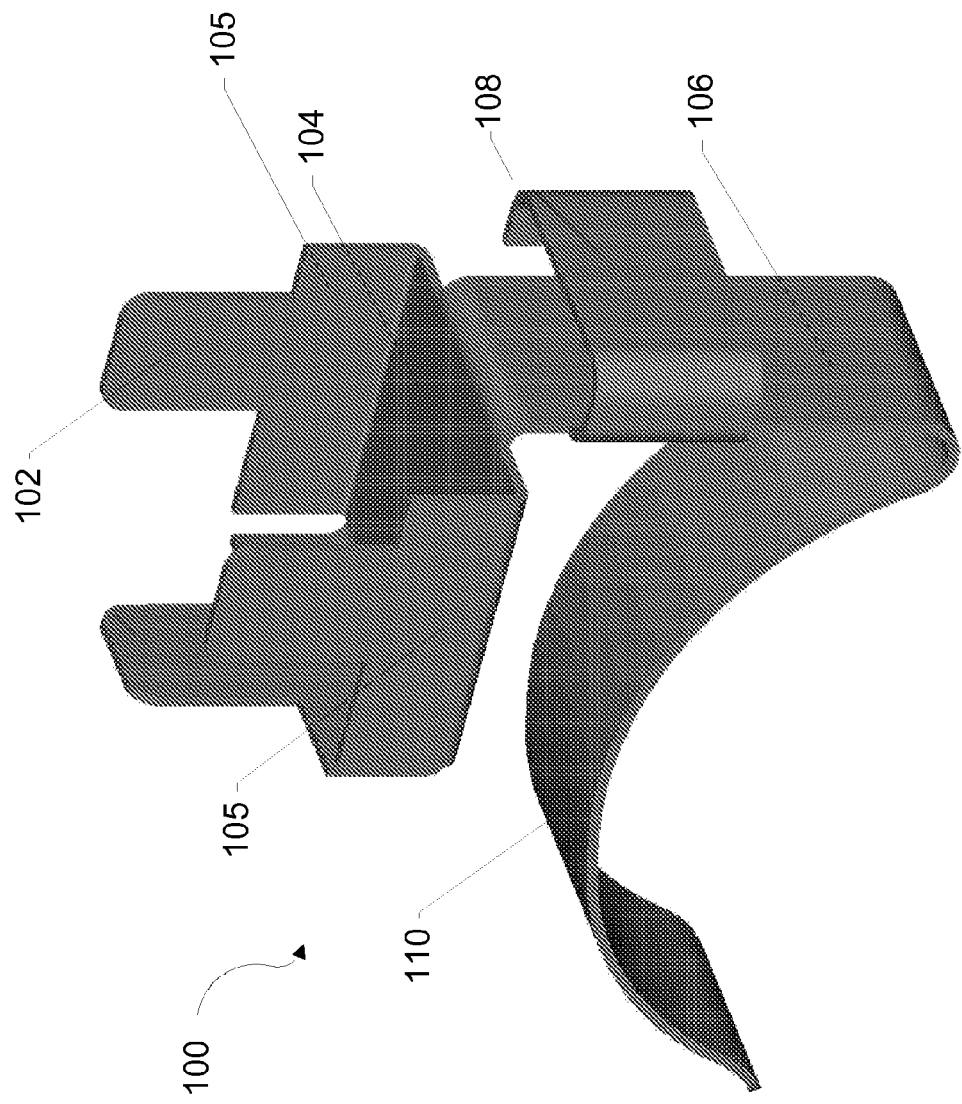
FIG. 1 is a perspective view of a thermal clip according to at least some illustrative embodiments.

FIG. 1 shows a thermal clip 100 according to one arrangement. The clip 100 may be used to transfer heat from a thermally emitting object to a thermal sensing device, such as a thermistor. In one illustrative use, the thermal clip 100 may be used to transfer heat from a thermally emitting object, such as a battery, to a thermistor which is connected to a printed circuit board and senses the temperature of the battery. This arrangement may be used when the temperature of the battery should be monitored and maintained within a certain range. In addition, the thermistor may be used to shut down the system, based on the temperature of the battery, as heat is transferred through the clip to the thermistor.

Further to FIG. 1, the clip 100 includes tabs 102 which aid in physically connecting the thermal clip 100 to a printed circuit board. In addition, a thermistor may be mounted to the printed circuit board and in thermal contact with the tabs 102. The clip 100 also includes a flat portion 104 in which a thermistor may be nested in some configurations. This flat portion 104 is substantially enclosed by side walls 105. These side walls are substantially perpendicular to the flat portion 104 and tabs 102 generally protrude up from the side walls 105. As shown in FIG. 1, side walls 105 may enclose three sides of the flat portion 104.

In addition, the thermal clip 100 includes a vertical stem 106 with a pocket portion 108 connected to it. In some configurations, the thermistor may be mounted in the pocket portion 108. The thermal clip 100 also includes a contact portion 110. The contact portion 110 is configured to follow the shape of a thermally emitting object. The contoured shape of the contact portion 110 allows for increased contact with the thermally emitting object so as to facilitate improved thermal conduction.

Figure 2:
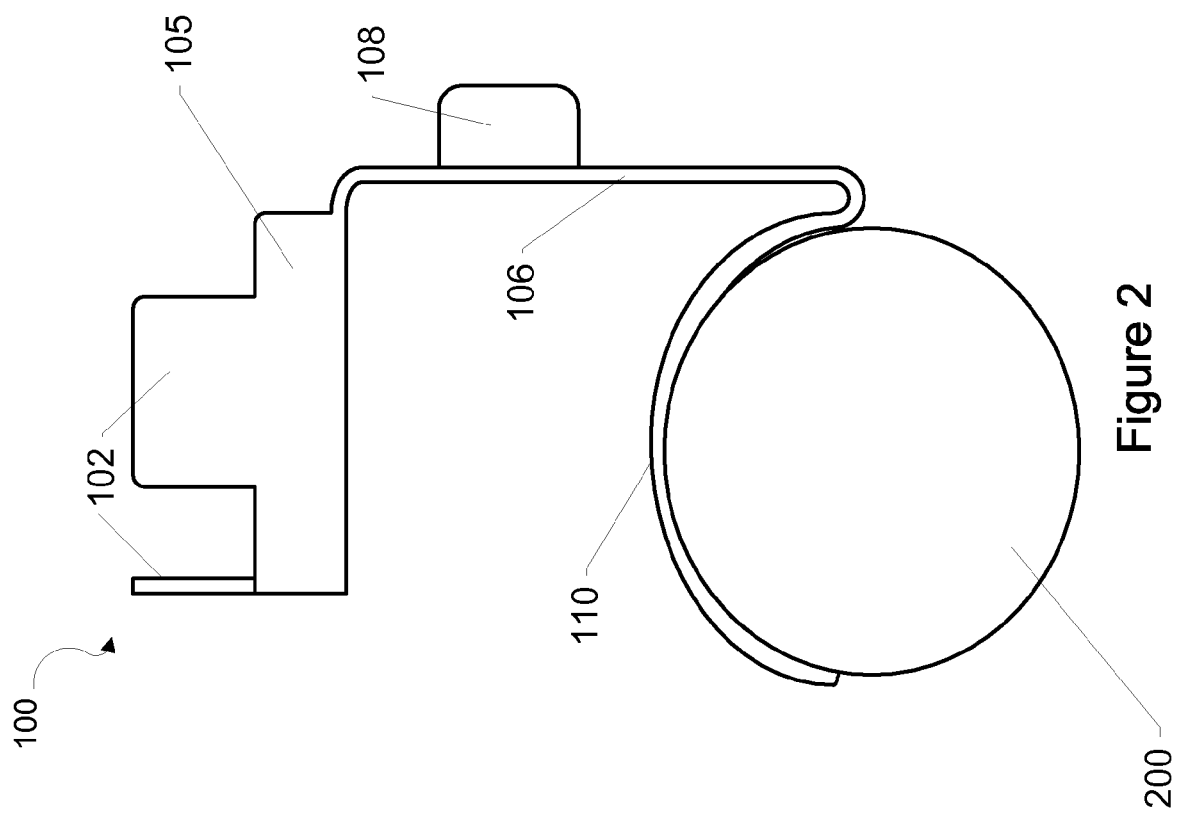
FIG. 2 is a side view of the thermal clip of FIG. 1.
Figure 3:
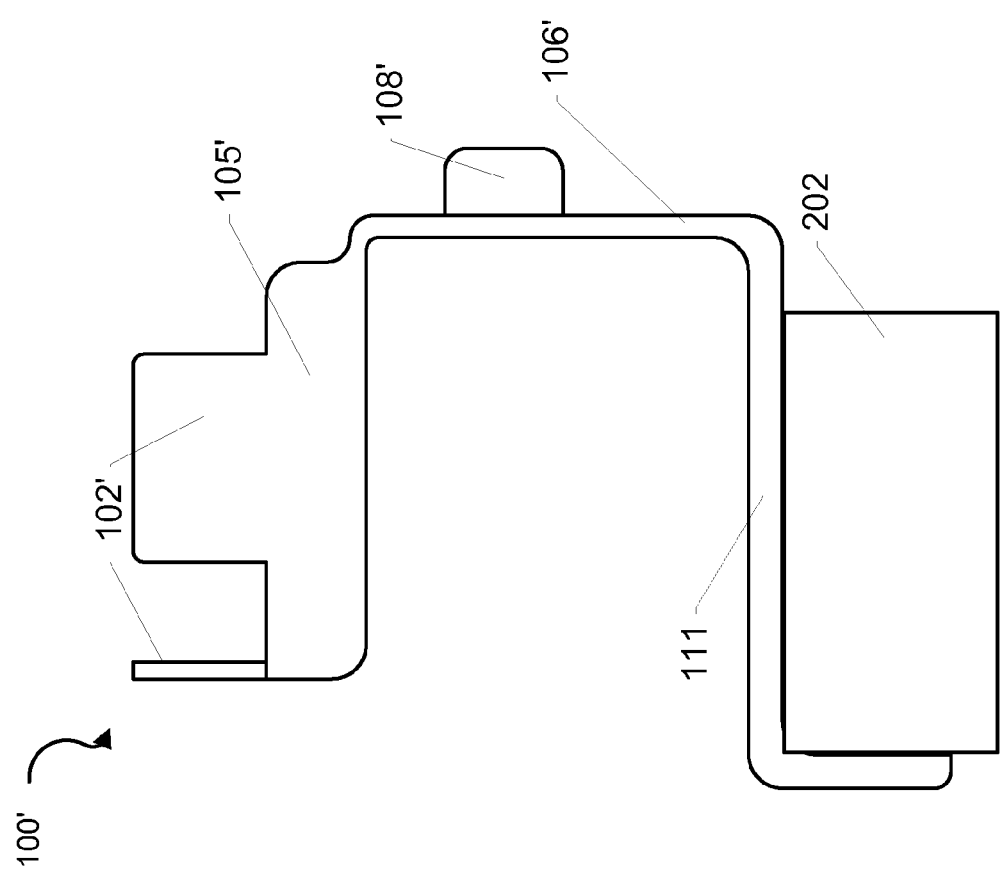
FIG. 3 is a side view of another configuration of the thermal clip of FIG. 1.

FIG. 2 is a side view of the thermal clip 100 of FIG. 1. The clip 100 of FIG. 2 includes a semi-circular shaped contact portion 110. This shape may be used to contact the surface of a thermally emitting object 200 having a round or circular cross section, such as a battery. FIG. 3 depicts a clip 100', similar to clip 100 of FIG. 2, but having a slightly different configuration. Tabs 102', side walls 105', vertical stem 106' and pocket 108' are similar to tabs 102, side walls 105, vertical stem 106 and pocket 108 in FIG. 2. Unlike clip 100, the contact portion 111 of clip 100' is substantially rectangular. This configuration is generally used with the thermally emitting object 202 that has a rectangular cross section. Other shapes may be used for the contact portions 110, 111, such as square, triangular, and the like, depending on the shape of the thermally emitting object being used. Using a contoured contact portion 110, 111 that follows the shape of the thermally emitting object may allow for reduction in the amount of thermal epoxy, thermal grease or other thermally conductive adhesives used to hold the thermal clip in place against the thermally emitting object. In some arrangements, no thermally conductive adhesives are needed to maintain contact between the thermal clip and the thermally emitting object.

Further to FIGS. 2 and 3, the thermal clips 100, 100' are generally a one piece construction and are formed of a thermally conductive material. For example, the thermal clips 100, 100' may be formed of a stamped metal. In one arrangement, the thermal clips 100, 100' may be formed of a springy or elastic material, such as beryllium copper, in order to apply and maintain a spring force to improve the thermal contact between the contact areas of the clip and the thermally emitting object and/or the clip and the thermistor in contact with the clip.

Figure 4:
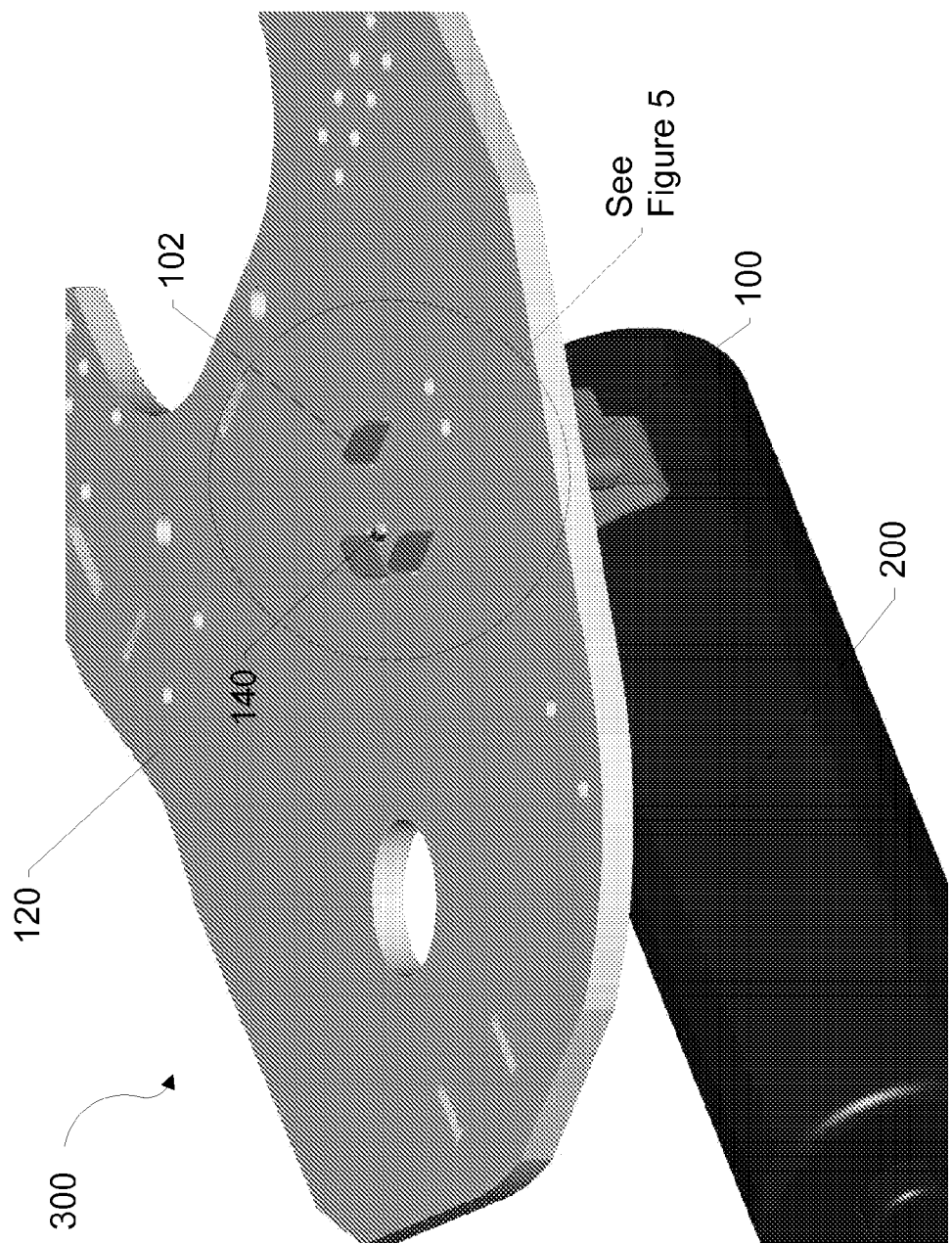
FIG. 4 illustrates a thermal sensing system, including the thermal clip of FIG. 1, in one arrangement.

FIG. 4 shows a thermal sensing system 300 as it appears in one arrangement. The system 300 uses thermal clip 100 having a semi-circular contact portion (not shown in FIG. 4). However, it is understood that similar arrangements may be used for the system 300 that use clip 100' or clips with contact portions having shapes other than semi-circular and rectangular.

The thermal clip 100 is connected to a printed circuit board 120 by tabs 102 that protrude through the printed circuit board 120. In one illustrative example, the tabs 102 are soldered to the printed circuit board 120. In addition, a thermistor 140 is shown. The arrangement of FIG. 4 includes a surface mounted thermistor 140 that is soldered to the printed circuit board 120. The thermistor 140 is generally in thermal contact with the thermally emitting object via a thermal connection with the tabs 102. For example, the thermistor 140 and tabs 102 may share a portion of solder used to mount each item to the printed circuit board 120. The solder then provides a thermal connection to the thermistor. In one arrangement, the thermistor is mounted to a thermally conductive pad on the printed circuit board. Alternate embodiments of this arrangement may use alternate methods of forming a thermal connection between the thermistor 140 and the thermal clip 100. Other mounting arrangements for the thermistor 140 are available and are discussed below.

Figure 5:
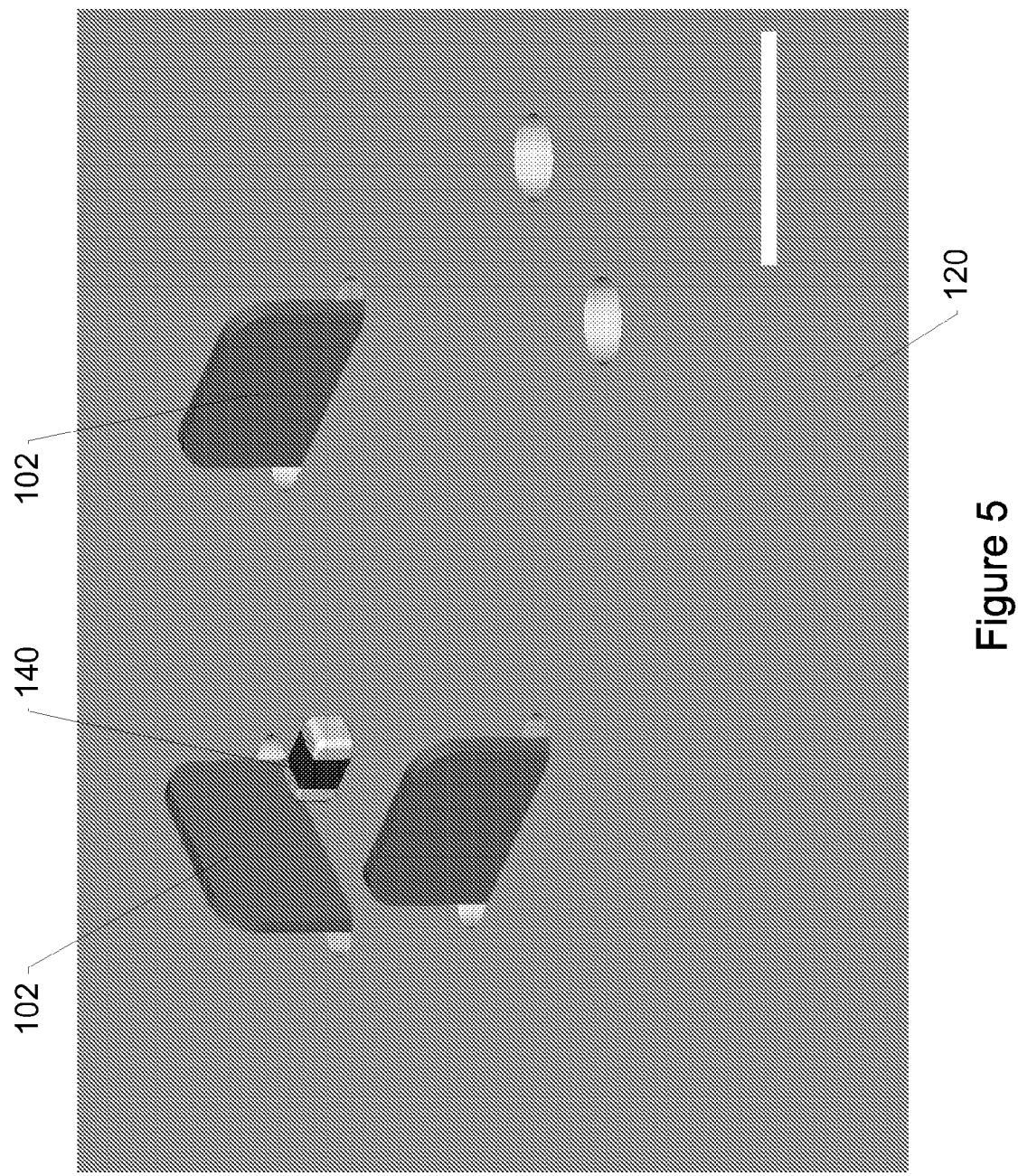
FIG. 5 is a detailed view of the connecting points of the thermal clip of the arrangement of FIG. 4.

FIG. 5 provides a detailed view of the thermistor 140 as mounted to the printed circuit board 120. In this example, the thermistor 140 is soldered to the printed circuit board 120. The thermistor 140 may share a portion of the solder with the tabs 102 that protrude through the printed circuit board 120. This arrangement allows for a thermal connection between the thermistor 140 and the thermal clip 100 via the solder.

Further to FIG. 4, the thermal clip 100 is used to transfer heat from a thermally emitting object 200. In one arrangement, the thermally emitting object 200 may be a battery. The thermal clip 100 is in contact with the battery along the contoured contact portion 110 of the thermal clip 100. This arrangement allows for substantial contact between the thermal clip 100 and the thermally emitting object 200. The substantial contact provides for better thermal transfer properties and allows for more accurate temperature sensing than systems in which contact is only at the battery terminals.

Heat is transferred from the battery 200 to the thermistor 140 via the thermal clip 100. The thermistor 140 senses the temperature of the battery 200 as it is transferred via the thermal clip 100. This arrangement may be used in a variety of circumstances in which monitoring and/or controlling temperature is important. In one illustrative example, the thermal sensing system may be used to sense the temperature of the rechargeable battery in a wireless mouse, during charging, to ensure the battery does not overheat. If the thermistor senses a temperature beyond a predetermined limit, the charging may be shut down.

Figure 6:
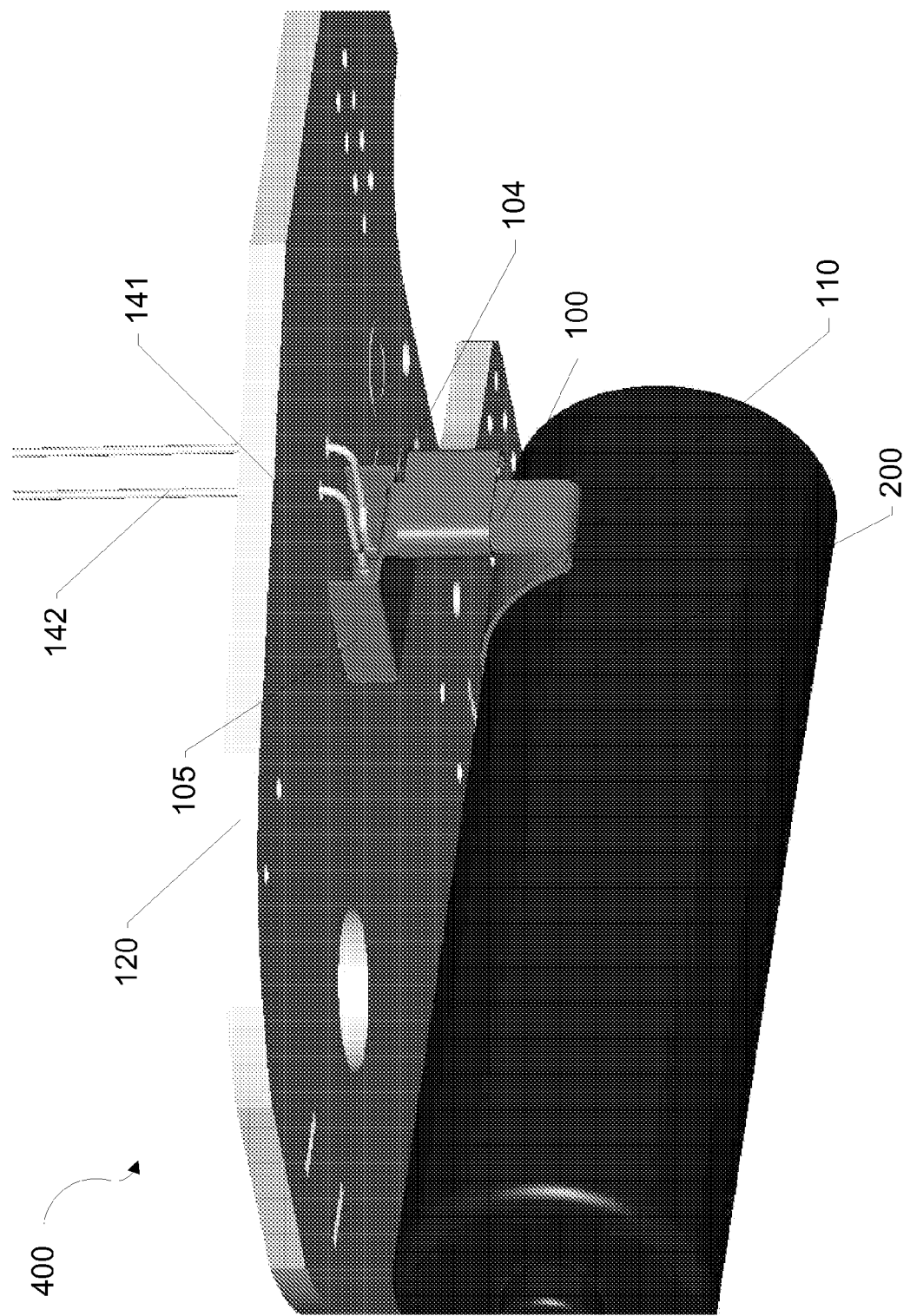
FIG. 6 illustrates the thermal sensing system, including the thermal clip of FIG. 1, according to another arrangement.

FIG. 6 shows a thermal sensing system 400 according to another arrangement. In this arrangement, a thermistor 141 is mounted beneath the printed circuit board 120 and in direct physical contact with the thermal clip 100. The thermistor 141 is mounted on the flat, relatively enclosed portion 104 of the thermal clip 100. In this arrangement, a thru-hole mount thermistor 141 is used (i.e., a thermistor having leads extending from it and through the printed circuit board 120). The direct physical contact between the thermistor 141 and the clip 100 allows for direct thermal contact between the two. This direct thermal contact aids in accurate temperature monitoring. In an alternate arrangement, the thermistor may be attached to the clip with a thermally conductive epoxy or tape. The epoxy or tape may be electrically insulating.

As shown, the thermistor 141 may be nested in the flat, substantially enclosed portion 104 of the thermal clip 100. The enclosure aids in thermal conduction by acting in a manner similar to a conventional oven. In particular, the enclosed area 104 contains the heat from side walls 105 (which heat is transferred from the thermally emitting object 200) within a volume surrounding the thermistor 141. This aids in monitoring an accurate temperature at the thermistor 141. The thermistor leads 142 then extend through the printed circuit board 120 and may be connected to the printed circuit board 120. For example, the leads 142 are soldered to the printed circuit board 120.

Mounting or nesting the thermistor 141 within the flat, substantially enclosed area 104 may reduce or eliminate the need for thermal epoxy or other thermal adhesives to maintain the position of the thermistor 141 and provide thermal conductivity. Rather, the thermistor 141 is held in place via friction between the flat, substantially enclosed portion 104 of the clip 100 and the printed circuit board 120. In addition, thermal conductivity is provided by the direct contact between the thermistor 141 and the clip 100. Alternatively, the thermistor 141 may be mounted within the substantially enclosed area 104 using thermal epoxy or other thermal adhesives or grease. In this alternate arrangement, the flat, substantially enclosed area 104 may provide an area to apply and/or contain thermal epoxy or other thermal adhesives or grease to improve the thermal path from the clip to the thermistor 141.

Figure 7:
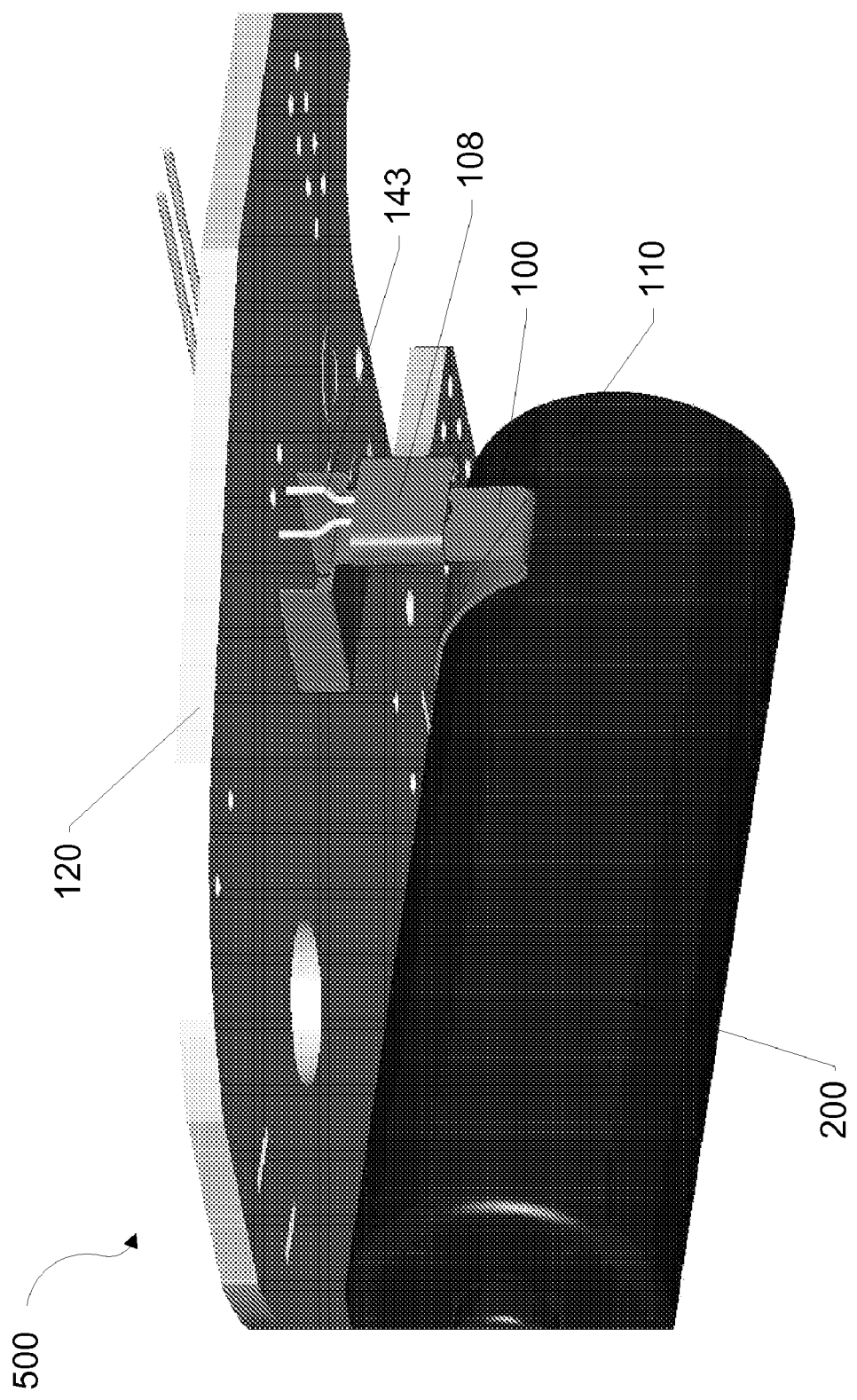
FIG. 7 illustrates the thermal sensing system, including the thermal clip of FIG. 1, according to yet another arrangement.

FIG. 7 shows a thermal sensing system 500 according to yet another arrangement. In this arrangement, the thermistor 143 may be a thru-hole type thermistor. The thermistor 143 is mounted in contact with the pocket portion 108 or the thermal clip 100. Alternatively, the thermistor 143 may be attached by thermal adhesives, such as epoxy, tape or thermal grease, to the clip surface near the contact surface 110. In one example, the pocket 108 is formed on the vertical stem 106 of the thermal clip 100; however, other arrangements may be used. In this arrangement, the thermistor 143 is also in direct physical and thermal contact with the thermal clip 100. The temperature of the thermally emitting object 200 may be transferred to the thermistor 143 via contact between the thermal clip 100 and the thermistor 143. Similar to the arrangement of FIG. 6, this arrangement 500 may reduce or eliminate the need for thermal epoxy or other thermal adhesives. The thermistor 143 is generally held in place by frictional contact with the stem 106 and the pocket 108 and direct contact between the thermistor 143 and the clip 100 also provides thermal conductivity.

FIGS. 6 and 7 depict the contact between the contact portion 110 and the thermally emitting object 200. The shape of the contact portion 110 provides substantial thermal contact between the thermally emitting object 200 and the clip 100 along the surface of the thermally emitting object 200. The corresponding shape of contact portion 110 and the thermally emitting object 200 may reduce or eliminate the need for thermal epoxy or other thermal adhesives.

Figure 8:
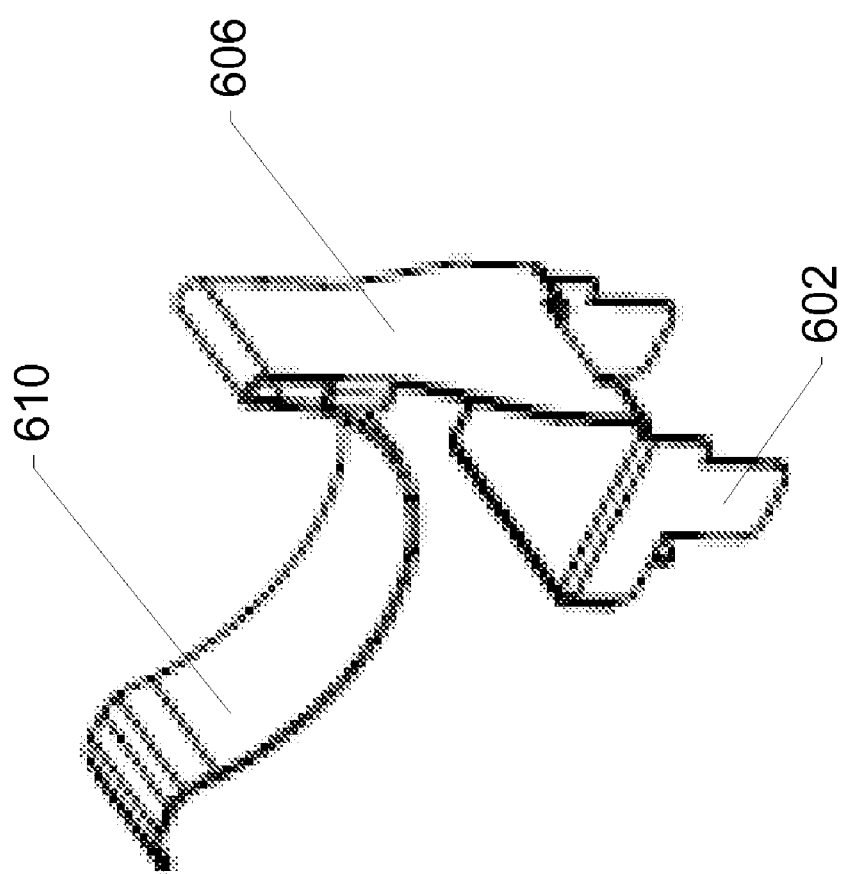
FIG. 8 is a perspective view of a thermal clip of another illustrative embodiment.
Figure 9:
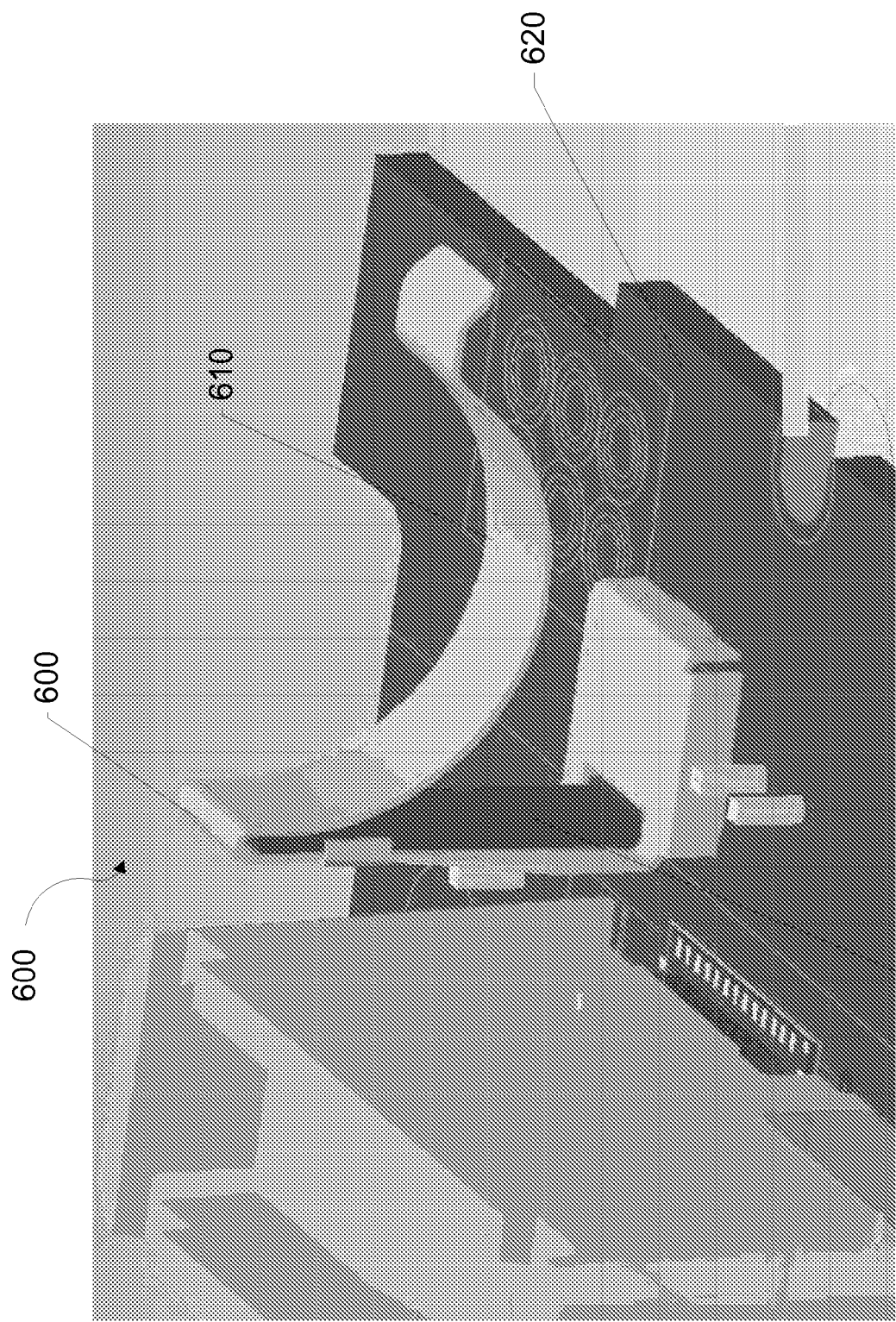
FIG. 9 illustrates a thermal sensing system, including the thermal clip of FIG. 8, according to another arrangement.

FIGS. 8 and 9 depict yet another arrangement of the thermal sensing system 600. In this arrangement, the contact portion 610 is arranged above the mounting tabs 602, stem 606 and printed circuit board 620. This arrangement locates the thermistor 640 in a pocket formed between the stem 606 and the contact portion 610.

Although the subject matter has been described in language specific to certain structural features and/or methodological acts, it is to be understood that the subject matter defined in the appended claims is not necessarily limited to the specific features or acts described above. Rather, the specific features and acts described above are disclosed as example forms of implementing the claims. Numerous other embodiments, modifications and variations within the scope and spirit of the appended claims will occur to persons of ordinary skill in the art from a review of this disclosure.

We claim:

1. A thermal sensing system, comprising:
   a thermally emitting object;
   a one-piece clip contacting the thermally emitting object and formed of a thermally conductive material, the one-piece clip comprising:
   a plurality of tabs substantially perpendicular to a generally flat portion configured for directly connecting the one-piece clip to a printed circuit board, wherein the plurality of tabs are in direct physical contact with the printed circuit board and protrude through it;
   a vertical stem extending downward from the generally flat portion; and
   a contact portion extending from the vertical stem that conforms to a three-dimensional shape of the thermally emitting object and is in contact with an outer surface of the thermally emitting object; and
   a thermistor in thermal contact with the one-piece clip portion and the printed circuit board, wherein the thermistor is configured for sensing the temperature of the thermally emitting object.

2. The thermal sensing system of claim 1, wherein the thermistor is mounted to a surface of the printed circuit board.

3. The thermal sensing system of claim 2, wherein the thermistor is in thermal contact with the one-piece clip portion via a solder connection and printed metallic pads on the printed circuit board between the one-piece clip and the thermistor.

4. The thermal sensing system of claim 1, wherein the thermistor is mounted to the one-piece clip.

5. The thermal sensing system of claim 1, further including a pocket formed on one side of the stem and configured for securing the thermistor.

6. The thermal sensing system of claim 5, wherein the thermistor is mounted in the pocket formed on the stem of the one-piece clip.

7. The thermal sensing system of claim 1, wherein the conforming shape of the contact portion is cylindrical.

8. The thermal sensing system of claim 1, wherein the thermally emitting object is a battery.

9. The thermal sensing system of claim 1, wherein the one piece clip is formed of an elastic material to apply spring force to improve thermal conduction of a thermal path.

10. A one-piece thermal clip, comprising:
    a generally flat portion having a plurality of side walls extending therefrom;
    a plurality of tabs extending from the side walls and configured for directly mounting the one-piece thermal clip, wherein the plurality of tabs are in direct physical contact with a printed circuit board and protrude through it;
    a vertical stem extending downward from the generally flat portion;
    a contact portion formed at one end of the stem and configured to conform to a three-dimensional shape of a thermally emitting object, the contact portion being in contact with an outer surface of the thermally emitting object; and
    wherein the one-piece thermal clip is formed of a thermally conductive material to allow for sensing of a temperature of the thermally emitting object by thermally sensing means.

11. The one-piece thermal clip of claim 10, wherein the thermal object is a battery.

12. The one-piece thermal clip of claim 10, further including a pocket formed on one side of the vertical stem.

13. The one-piece thermal clip of claim 12, wherein the pocket is configured for securing the thermally sensing means, wherein said thermally sensing means is a thermistor.

14. The one-piece thermal clip of claim 10, wherein the conforming shape of the contact portion is cylindrical.

15. The one-piece thermal clip of claim 10, wherein the conforming shape of the contact portion is rectangular.

16. The one-piece thermal clip of claim 10, wherein the one-piece clip is formed of beryllium copper to apply a spring force to surfaces of the one-piece clip in a thermal path.

17. The one-piece thermal clip of claim 10, wherein the generally flat portion is configured for securing a thermistor.

18. A thermal sensing system, comprising:
    a thermally emitting object;
    a one-piece clip formed of a thermally conductive material, the one-piece clip including:
    a flat, substantially enclosed portion;
    a plurality of tabs extending from the flat, substantially enclosed portion and configured for directly connecting the one-piece clip to a printed circuit board, wherein the plurality of tabs are in direct physical contact with the printed circuit board and protrude through it;
    a vertical stem protruding downward from the flat, substantially enclosed portion and having a substantially enclosed pocket formed in one side of the vertical stem; and thermally sensing means in thermal contact the thermally emitting object.

19. The thermal sensing system of claim 18, further including means for securing the thermally sensing means, wherein said thermally sensing means is a thermistor.

20. The thermal sensing system of claim 18, wherein the means for securing the thermistor includes nesting the thermistor in the substantially enclosed pocket formed on the vertical stem.

* * * * *

UNITED STATES PATENT AND TRADEMARK OFFICE
CERTIFICATE OF CORRECTION

PATENT NO. : 7,465,088 B2  
APPLICATION NO. : 11/425926  
DATED : December 16, 2008  
INVENTOR(S) : Gino S. Garcia et al.

It is certified that error appears in the above-identified patent and that said Letters Patent is hereby corrected as shown below:

In column 6, lines 5-6, in Claim 9, delete "one piece" and insert -- one-piece --, therefor.

Signed and Sealed this

Third Day of May, 2011

David J. Kappos  
*Director of the United States Patent and Trademark Office*